US010847053B2

(12) United States Patent
Kahng

(10) Patent No.: US 10,847,053 B2
(45) Date of Patent: Nov. 24, 2020

(54) METHODS FOR REPRESENTING NUTRITIONAL INFORMATION OF A FOOD PRODUCT TO GROCERY SHOPPERS

(71) Applicant: Gredo Kahng, Houston, TX (US)

(72) Inventor: Gredo Kahng, Houston, TX (US)

( * ) Notice: Subject to any disclaimer, the term of this patent is extended or adjusted under 35 U.S.C. 154(b) by 55 days.

(21) Appl. No.: 15/608,682

(22) Filed: May 30, 2017

(65) Prior Publication Data
US 2018/0277016 A1    Sep. 27, 2018

Related U.S. Application Data

(63) Continuation-in-part of application No. 15/467,764, filed on Mar. 23, 2017, now abandoned.

(51) Int. Cl.
| | |
|---|---|
| G09B 19/00 | (2006.01) |
| G09F 19/00 | (2006.01) |
| G09F 7/14 | (2006.01) |
| G09F 7/10 | (2006.01) |
| G09B 5/02 | (2006.01) |
| G09F 3/02 | (2006.01) |

(52) U.S. Cl.
CPC ........... *G09B 19/0092* (2013.01); *G09B 5/02* (2013.01); *G09F 3/02* (2013.01); *G09F 7/10* (2013.01); *G09F 7/14* (2013.01); *G09F 19/00* (2013.01)

(58) Field of Classification Search
CPC ...... G09B 19/0092; G09B 5/02; G09B 19/00; G09F 1/00; G09F 3/00; G09F 19/00
USPC .......................................................... 434/127
See application file for complete search history.

(56) References Cited

U.S. PATENT DOCUMENTS

| | | | | |
|---|---|---|---|---|
| 2004/0045202 | A1* | 3/2004 | Arrendale, III | ......... G09F 23/00 40/637 |
| 2007/0083426 | A1* | 4/2007 | Osigwe | .............. G06Q 30/0241 345/87 |

* cited by examiner

*Primary Examiner* — James B Hull
(74) *Attorney, Agent, or Firm* — Lyman Smith; Patent Service Associates

(57) ABSTRACT

A method for representing nutritional information of a food product to shoppers at a grocery store may use a nutrition sign for enhancing the printed matter for display in the proximity of food items at the grocery store that associates the printed information with the food product by use of figures that represent the members of the family prominently displayed. The nutritionally sign itself can physically indicate the food product, such as by being made of a certain shape and design. It also relates the benefits and efficacy of consuming the food product and its components to the consumers age, physical condition and/or gender, in words, symbols or characterizations of people and color coding of the media. It also relates the beneficial components of the food product without the need for reading the small print on product labels.

11 Claims, 3 Drawing Sheets

METHODS FOR REPRESENTING NUTRITIONAL INFORMATION OF A FOOD PRODUCT TO GROCERY SHOPPERS

CROSS-REFERENCE TO RELATED APPLICATION

This application is a continuation-in-part of U.S. patent application Ser. No. 15/467,764, filed Mar. 23, 2017, which is a continuation of U.S. patent application Ser. No. 14/924,462, filed Oct. 27, 2015, which is a continuation-in-part of U.S. patent application Ser. No. 14/465,628, filed Aug. 21, 2014, which is a continuation-in-part of U.S. patent application Ser. No. 13/567,302, filed Aug. 6, 2012, which is a continuation-in-part of U.S. patent application Ser. No. 12/715,647, filed Mar. 2, 2010 and claims the benefit of provisional application 61/156,747, filed Mar. 2, 2009.

BACKGROUND OF THE INVENTION

The present invention represents a large step forward in the process field of a food product advertising displayed with the food product at the grocery store. The present invention plants an intellectual impression in the minds of shoppers that buying a food product that is appealing and is an expression of love to a specific person on their shopping list and is an intelligent, thoughtful and healthy choice. First, the nutrition sign uses figures base having the specified color coding of the background to draw attention to the shopper and the shopper's family members would benefit from the product and the reasons why. Then the nutrition sign firmly associates itself with the food on display with prominently located color picture of the food product and the product name in bold type. The figures also serve as a rapid indexing marker helping the shopper to find the efficacies of the food that specifically benefit the characterized loved one from a list of components and efficacies. Lastly, the sign reinforces the shopper's self-image, and confidence with the statements of components and health benefits or efficacies. Self-image because they are making an intellectual rather than an impulse decision. Confidence because they will be able to answer the inevitable question at the kitchen table "why are you feeding us this stuff instead of the food we are used to eat?" The shopper having a retort like "well this new food is good for relieving the joint pain that bothers you!" will have the shopper returning to the store and paying attention to the signs on the next shopping trip.

The statement of benefit or efficacy promotes purchase by relating the components of the food product to the particular age group, physical condition or gender of the persons who will ultimately consume the food product. The present invention relates all of this information to a grocery shopper at a glance to be effective through the use of photography, relating efficacy and component of the food product to the age, physical condition and gender of the consumer in succinct outline form and summarizing the nutritional components as well.

The present invention also provides information that may have a positive effect on the ultimate consumer based on age, physical condition and/or gender and conveys additional information by use of characterization of people that may also be color coded and/or through an information based color coded background of the printed media.

PRIOR ART

The following disclosures are found in the art of record.

The published patent application to Bateman (US2004/0023189) discloses a system and method for displaying nutritional information having a food product illustration and a partial or completely color coded background indicating the nutritional value of the food product. However Bateman lacks a food product photograph, lacks a printed name of the food product, also lacks efficacy and component of the food product related to the age, physical condition or gender of the ultimate consumer, and finally lacks characterizations of people according to age, physical condition or gender and color coding of the background.

The patent to Frankhauser (U.S. Des. 323,680) discloses a sign for communicating food product information relating to leftovers that is divided into three sections vertically with pictures or illustrations in the top section, a list of leftovers names in the center section. Frankhauser, however, lacks displaying nutritional information, lacks having a color coded background indicating the nutritional value of the food product. Bateman also lacks a food product photograph and also lacks efficacy and component of the food product related to the age, physical condition or gender of the ultimate consumer, and finally lacks characterizations of people according to age, physical condition or gender and color coding of the background.

The published patent application to Gordon (US 2006/0263750) discloses printed matter communicating the nutritional value of a food product. However, Gordon lacks a food product photograph and printed name of the food product, also lacking is the efficacy and component of the food product related to the age, physical condition or gender of the ultimate consumer, there also are no characterizations of people according to age, physical condition or gender, nor does Gordon disclose color coding of the printed media and a listing of beneficial nutritional components.

SUMMARY OF THE INVENTION

The present invention relates to methods for representing nutritional information of a food product to shoppers at a grocery store. The methods of the present invention may use a sign that is designed to assist grocery store shoppers in the selection of food products that are healthy for themselves and the members of their family. The sign clearly associates the nutritional information with the correct food product with a picture of the food product and the food product name. The sign itself further provides information to the consumer by being shaped and designed in a manner that relates to the particular food item. The shape of the sign provides a functional relationship between the substrate (the physical sign itself) and the printed matter on the sign (nutritional information related to the product offered based on the shape of the sign). The benefits or efficacy and component of the food product is then stated in summary outline format, followed by specific benefits for consumers that are members of specific age groups, physical conditions such as pregnancy and/or gender. The shopper's attention is directed to specific statements of efficacy by the presence of characterizations of people in specific age groups, physical conditions such as pregnancy and/or gender and directed by a color coded background to corresponding statements of interest. These statements are in outline form and are followed by a list of the primary components of the food product. Further information regarding the nutritional benefits or efficacy and components of the food product can be communicated by color coding of the characterizations or coloring of the media.

In one aspect of the present invention, a method for representing nutritional information of a food product to shoppers at a grocery store comprises visibly representing nutritional information in a first region of a product sign, the shape and design of the sign itself physically representing the food product; and visibly representing efficacy and component information in a second region of the product sign, the efficacy information including general statements relating to efficacy of the food product and color-coded efficacy statements, where the color-code relates to a specific group and includes an image representing the specific group. Because the sign itself is shaped and designed in a manner that relates to the particular food item, the display provides a functional relationship between the substrate (the physical sign itself) and the printed matter on the sign (nutritional information related to the product offered based on the shape of the sign).

In another aspect of the present invention, a method for representing nutritional information of a food product to shoppers at a grocery store comprises visibly representing nutritional information in a first region of a product sign, the shape and design of the sign itself physically representing the food product; visibly representing at least one benefit group in a second region of the product sign, the at least one benefit group includes at least one of a baby, a child, a boy, a girl, a teen boy, a teen girl, a man, a woman, a pregnant woman, an elderly man and an elderly woman; and visibly representing efficacy information adjacent the at least one benefit group, the efficacy information describing a benefit for a specific benefit group identified adjacent the efficacy information, wherein a background color is provided for each of the benefit groups, wherein the shopper can find the food products providing benefits to the specific benefit group by scanning for the background color representing the specific benefit group.

These and other features, aspects and advantages of the present invention will become better understood with reference to the following drawings, description and claims.

DETAILED DESCRIPTION OF THE INVENTION

Figure 1:
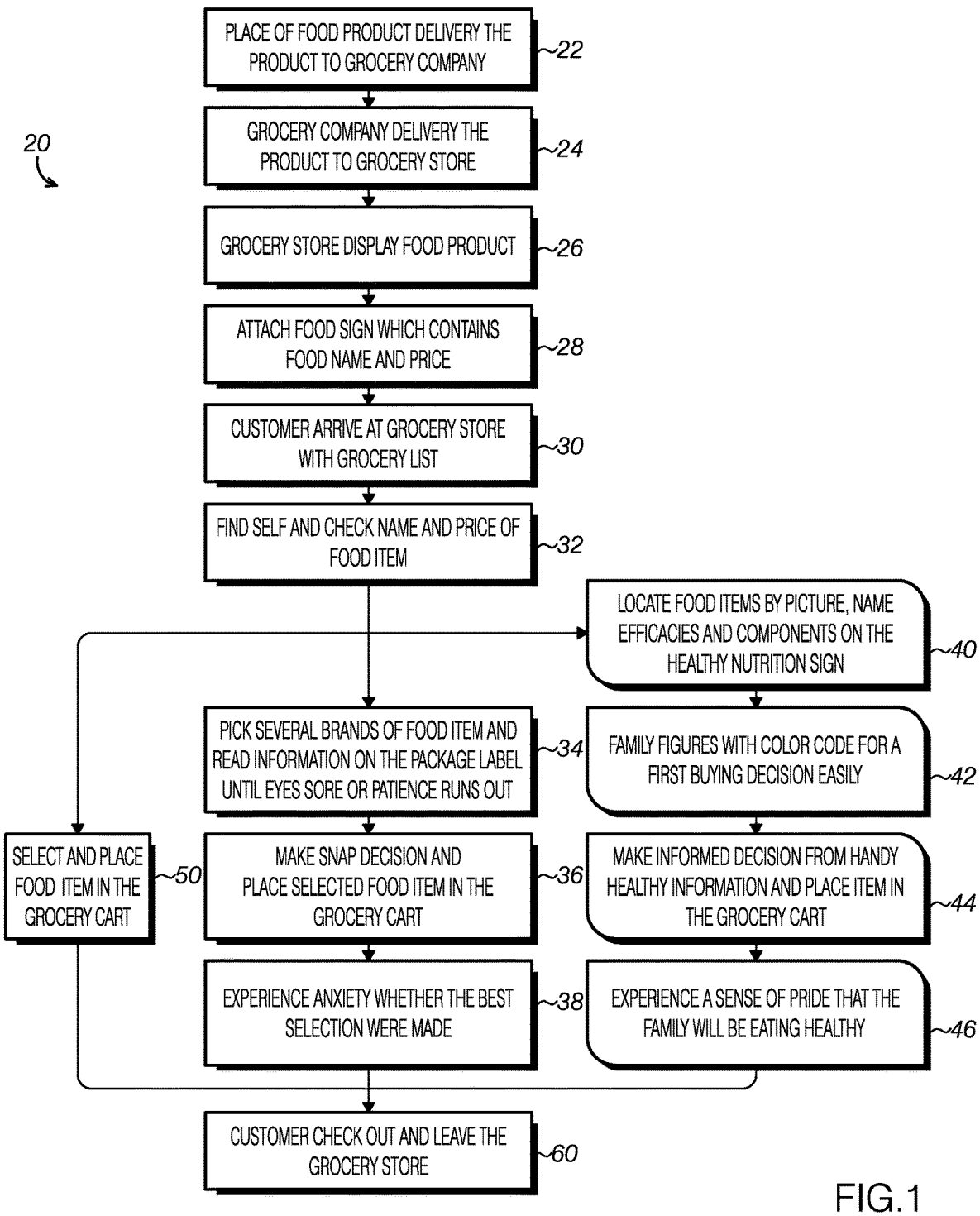
FIG. 1 is a flow chart describing a grocery shopping method according to an exemplary embodiment of the present invention and comparing that method side-by-side with a conventional grocery shopping method.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a method for representing nutritional information of a food product to shoppers at a grocery store. The methods may use a nutrition sign for enhancing the printed matter for display in the proximity of food items at the grocery store that associates the printed information with the food product by use of figures that represent the members of the family prominently displayed. The nutritionally sign itself can physically indicate the food product, such as by being made of a certain shape and design. It also relates the benefits and efficacy of consuming the food product and its components to the consumers age, physical condition and/or gender, in words, symbols or characterizations of people and color coding of the media. It also relates the beneficial components of the food product without the need for reading the small print on product labels.

The nutritional sign may be a conventional sign in a grocery store, or may be one or more of a sticker, a poster, a brochure, a flyer, an electronic display device, a website, a receipt, a shopping bag, a food nutritional book. For example, the nutritional sign may be provided on a grocery store's website, where the user can utilize the methods of the present invention, even in an electronic environment. The nutritional sign may be written in one or more languages, such as English, a language foreign to English, a combination of English and one or more languages foreign to English, or a combination of languages foreign to English. In some embodiments, the nutritional information may be printed on a sign substrate that is formed in a shape or is otherwise indicative of the food product being advertised. This substrate forms a functional relationship to the nutritional information (printed matter) disposed on the substrate.

Poor nutrition is rapidly becoming one of the major health problems in the civilized world affecting all people including babies, children, teenagers, men, women, pregnant women and seniors. Proper nutrition is one of the leading defenses against this insidious problem. There are many sources for nutritional information available to the public including, books, newspapers and the Internet. However, few shoppers carry such nutritional information with them when they shop in the grocery store. The present invention relates to methods for representing nutritional information of food products to grocery store shoppers that includes a sign that summarizes nutritional information that is displayed in proximity of a food product, making it convenient for the shopper to make wise dietary choices in the grocery store.

Figure 2:
FIG. 2 is an exemplary nutritional information sign that may be used in the methods of the present invention.

Referring to FIGS. 1 and 2, the methods of the present invention may be practiced with a nutrition sign 10 that includes a first section 12 including store or grocery company and product identification 74, such as a bar code, a name of the product 72, and pricing information 70; a second section 14 including a description region, which may include a picture 76 of the product and components 78 of the product; and a third section 16 that includes nutritional benefits or efficacy information 80 of the product as well as a color-coded background 84, 86, 88, 90 based on the recipient and the FIG. 82. The components 78 of the product can include, for example, vitamin A1, B1, B3, B12, C, D, minerals, iron, copper, magnesium, zinc, calcium and the like.

For example, as shown in FIG. 2, a nutrition sign 10 for oysters may include, in the third region, bullets listing benefits or efficacies of oysters and may include a color coded background 84, 86, 88, 90. The color coded background 84, 86, 88, 90 may provide different colors for each of the designated recipients, such as babies, children, adolescents, adults, and seniors, as well as different colors for specific benefits for men or women. Within each color coded region will appear the benefits for that designated recipient. For example, when information on the sign 10 relates to babies, the color may be, for example, light yellow.

A shopper looking for products for their baby can now, by using the nutrition sign 10, easily find products that may benefit babies (by looking for a baby figure and/or a light yellow color coded background, for example) and may then read the specific benefits. Shoppers buying products for other groups may use a similar technique.

By providing the nutritional information on the sign 10, a shopper does not have to pick up the product and try to read the fine print. This also helps the grocer as the shoppers will be less likely to pick up a product, decide they do not want it, and return it to an incorrect location on the shelf.

Referring back to FIG. 1, a method 20 of shopping for representing nutritional information of a food product to grocery shoppers who can shop for nutritional food products without the nutritional sign and with nutritional sign of the present invention is described.

Both methods include the steps where the food products are delivered to the grocery company 22 and the grocery company delivers the products to the grocery store 24. The grocery store then displays the food products 26 with the appropriate signage 28 which has a food name and price. The flow chart of FIG. 1 shows, in a vertical flow, the case where conventional signage which has a food name and price is provided. At the right hand off-shoot of the flow chart of FIG. 1, a method using the signage of the present invention is described. At the left hand side of the flow chart, the shopper simply picks a product and places it into their shopping cart 50.

Figure 3:
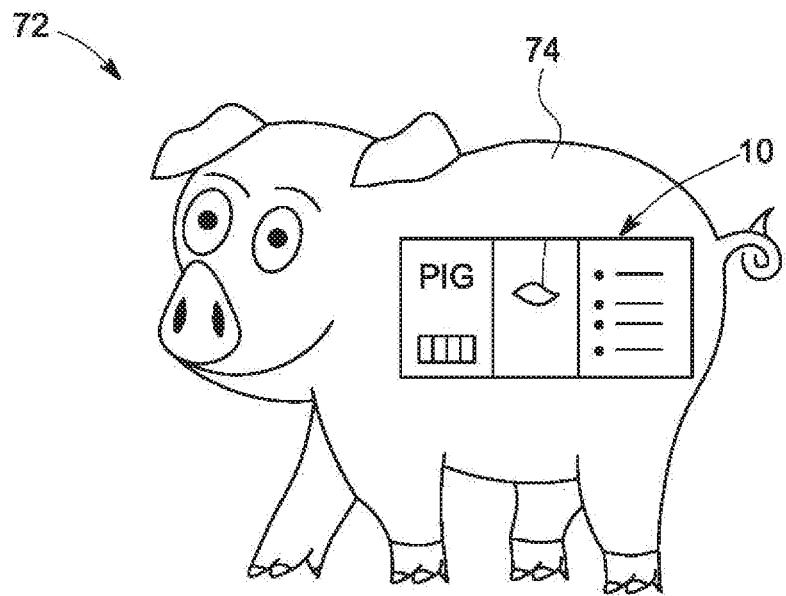
FIG. 3 is an exemplary nutritional information sign disposed on a substrate indicative of the food product according to an exemplary embodiment of the present invention.
Figure 4:
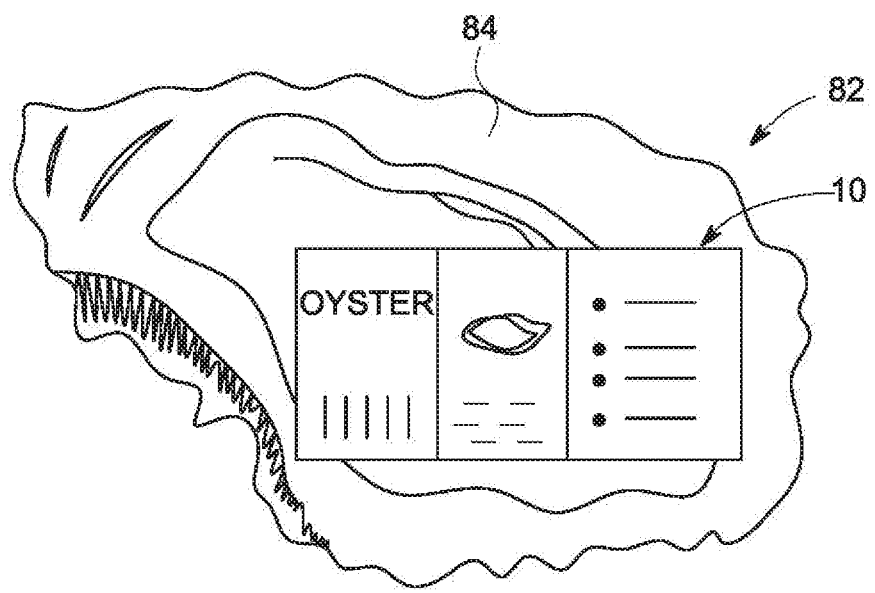
FIG. 4 is an exemplary nutritional information sign disposed on a substrate indicative of the food product according to another exemplary embodiment of the present invention.

Referring to FIGS. 3 and 4, a substrate 74, 84 for a nutritional display 72, 82 can be configured to convey information to the shopper. Typically, the substrate 74, 84 may be formed in a shape representative of the product being advertised by the sign 10 displayed thereupon. The sign 10 can include information similar to that described above with respect to sign 10 described above. Thus, the sign 10 can be incorporated into the substrate 74, 84 to convey not only the information described above with respect to sign 10, but also, by quickly visually scanning the various nutritional signs, the shopper can quickly find information on their desired products. The substrate 74, 84 is functionally related to the nutritional information printed on the substrate 74, 84. Thus, there is formed a functional relationship between the substrate 74, 84 and the printed matter displayed on the sign 10.

According to conventional methods, the shopper arrives at the store with a grocery list 30. The shopper then finds an aisle having a food item that is on the shopping list. Next, finds a shelf or display 32 with several brands of the sought after food item. Now the shopper has to pick up and read the product information on several packages until their eyes get sore or their patience runs out 34. Next, the shopper makes a snap decision and places the selected item in the grocery cart 36. Finally, the shopper experiences anxiety whether the best selections were made 38 and they check out and leave the grocery store 60.

With the signage of the present invention, the methods of the present invention change significantly. The shopper now has access to the nutrition sign when the shopper arrives at the grocery store with a grocery list. Then, the shopper scans the nutritional displays 72, 82 to quickly and easily find an aisle having a food item on the list 32. In contrast to the shopper using the conventional signage which has only a food name and price, the shopper with access to the nutritional sign 10 locates food items by the pictures and names on the nutrition sign 40. Then the shopper visualizes the family members in relation to the figures and color-coded background on the nutrition sign 10 for a first buying decision (picking the food item associated with the nutrition sign 10 having figures that represent the shopper's family character) 42. The shopper can now make an informed decision from handy information and place selected item in the grocery cart 44. Lastly, the shopper experiences a sense of pride that the family will be eating healthy 46 and the shopper checks out and leaves the grocery store 60.

It should be understood, of course, that the foregoing relates to exemplary embodiments of the invention and that modifications may be made without departing from the spirit and scope of the invention as set forth in the following claims.

I claim:

1. A method for representing nutritional information of a food product to grocery shoppers, comprising:
    visibly representing nutritional information in a first region of a plurality of food product signs each representing the respective food product, each food product sign being disposed on a substrate that, itself, is physically indicative of and functionally related to the food product by having a shape representative of the respective food product;
    visibly representing a nutritional benefit or efficacy statements in a second region of each food product sign, the nutritional benefit or the efficacy statements relating to a specific group and including an image representing the specific group, the specific group is color coded and includes at least one of a baby, a child, a boy, a girl, a teen boy, a teen girl, a man, a woman, a pregnant woman, an elderly man and an elderly woman, and the specific group chosen as a group that benefits from consumption of the food product; and
    displaying the food product sign within visual proximity to the product, wherein
    the image is disposed on a background pre-assigned to the specific group, the image includes one or more of a baby, a child, a boy, a girl, a teen boy, a teen girl, a man, a woman, a pregnant woman, an elderly man and an elderly woman, and
    the background representing a first specific group on a first one of the plurality of food product signs is the same as the background representing the first specific group on any other one of the plurality of food product signs, and a first background representing the first specific group on the first one of the plurality of food product signs is different from any other background representing any specific group other than the first specific group.

2. The method of claim 1, wherein the background is a color coded background.

3. The method of claim 1, further comprising a visible representation of the food product as a picture of the food product.

4. The method of claim 1, further comprising a visible representation of the food product as a name of the food product.

5. The method of claim 1, wherein the food product sign of the food product is selected from the group consisting of a sign, a sticker, a poster, a brochure, a flyer, an electronic display device, a website, and media for carrying the food product nutritional information.

6. The method of claim 1, wherein the visibly representing nutritional information of the food product is written in one or more languages selected from the group consisting of English, a language foreign to English, a combination of English and a language foreign to English, and a combination of languages foreign to English.

7. A method for representing nutritional information of a food product to grocery shoppers, comprising:
   visibly representing nutritional information in a first region of a food product sign representing the food product, the food product sign being disposed on a substrate that, itself, is physically indicative of and functionally related to the food product by having a shape representative of the food product;
   visibly representing an image of at least one benefit group in a second region of the food product sign, the at least one benefit group being color coded and including at least one of a baby, a child, a boy, a girl, a teen boy, a teen girl, a man, a woman, a pregnant woman, an elderly man and an elderly woman, the at least one benefit group chosen as a group that benefits from consumption of the food product, the image includes one or more of a baby, a child, a boy, a girl, a teen boy, a teen girl, a man, a woman, a pregnant woman, an elderly man and an elderly woman;
   visibly representing efficacy information adjacent the at least one benefit group, the efficacy information describing a benefit for a specific benefit group identified adjacent the efficacy information; and
   displaying the food product sign within visual proximity to the product, wherein
   a background color is provided for each of the benefit groups, wherein the shopper can find the food products providing benefits to the specific benefit group by scanning for the background color representing the specific benefit group.

8. The method of claim 7, further comprising a visible representation of the food product as a picture of the food product.

9. The method of claim 7, further comprising a visible representation of the food product as a name of the food product.

10. The method of claim 7, wherein the food product sign of the food product is selected from the group consisting of a sign, a sticker, a poster, a brochure, a flyer, an electronic display device, a website, and media for carrying the food product nutritional information.

11. The method of claim 7, wherein the visibly representing nutritional information of a food product is written in one or more languages selected from the group consisting of English, a language foreign to English, a combination of English and a language foreign to English, and a combination of languages foreign to English.

\* \* \* \* \*